(12) United States Patent
Yoo

(10) Patent No.: US 11,194,332 B2
(45) Date of Patent: Dec. 7, 2021

(54) AUTONOMOUS DRIVING CONTROL APPARATUS AND METHOD

(71) Applicant: HYUNDAI MNSOFT, INC., Seoul (KR)

(72) Inventor: Wang Geon Yoo, Seoul (KR)

(73) Assignee: HYUNDAI MNSOFT, INC., Seoul (KR)

( * ) Notice: Subject to any disclaimer, the term of this patent is extended or adjusted under 35 U.S.C. 154(b) by 271 days.

(21) Appl. No.: 16/465,105

(22) PCT Filed: Nov. 28, 2017

(86) PCT No.: PCT/KR2017/013708
§ 371 (c)(1),
(2) Date: May 29, 2019

(87) PCT Pub. No.: WO2018/101709
PCT Pub. Date: Jun. 7, 2018

(65) Prior Publication Data
US 2019/0384293 A1 Dec. 19, 2019

(30) Foreign Application Priority Data
Nov. 30, 2016 (KR) ........................ 10-2016-0161365

(51) Int. Cl.
*G05D 1/00* (2006.01)
*G05D 1/02* (2020.01)
(Continued)

(52) U.S. Cl.
CPC ......... *G05D 1/0088* (2013.01); *G05D 1/0214* (2013.01); *G05D 1/0246* (2013.01);
(Continued)

(58) Field of Classification Search
CPC .. G05D 1/0088; G05D 1/0214; G05D 1/0246; G05D 1/0276; G05D 2201/0213;
(Continued)

(56) References Cited

U.S. PATENT DOCUMENTS

2010/0238283 A1 9/2010 Kim
2015/0039156 A1 2/2015 Shibata
(Continued)

FOREIGN PATENT DOCUMENTS

DE 102014222058 A1 5/2016
JP 2007-008281 A 1/2007
(Continued)

OTHER PUBLICATIONS

Extended European Search Report, Application No. 17875158.2-1012/3549839 (PCT/KR2017013708), Hyundai Mnsoft, Inc. (dated Jul. 9, 2020).

*Primary Examiner* — Marthe Y Marc-Coleman
(74) *Attorney, Agent, or Firm* — Morgan, Lewis & Bockius LLP

(57) ABSTRACT

An autonomous driving control apparatus may include an image capturing unit configured to capture a driving road image of an ego vehicle; and a control unit configured to generate virtual lanes on a road with no lines, the virtual lanes corresponding to the number of lanes which are decided based on the width of the road with no lines, when the road with no lines is detected in front of the ego vehicle through the driving road image captured by the image capturing unit, and control autonomous driving of the ego vehicle to drive on one of the generated virtual lanes. When a front object is detected from the driving road image, the control unit may control the autonomous driving of the ego vehicle to avoid the front object and drive on the road with no lines.

14 Claims, 7 Drawing Sheets

(51) Int. Cl.
*B60W 30/09* (2012.01)
*B60W 30/16* (2020.01)

(52) U.S. Cl.
CPC ........... *G05D 1/0276* (2013.01); *B60W 30/09* (2013.01); *B60W 30/16* (2013.01); *B60W 2554/00* (2020.02); *B60W 2554/4041* (2020.02); *G05D 2201/0213* (2013.01)

(58) Field of Classification Search
CPC ..... B60W 2554/00; B60W 2554/4041; B60W 30/09; B60W 30/16; B60W 30/18163; B60W 2556/45; B60W 2420/52; B60W 2530/14; B60W 2552/00; B60W 2420/42; B60W 2556/65; B60W 30/10; B60W 30/08; B60W 30/14; B60W 40/06
See application file for complete search history.

(56) References Cited

U.S. PATENT DOCUMENTS

| | | | | |
|---|---|---|---|---|
| 2015/0120138 A1* | 4/2015 | Zeng | ................ | G01S 7/4808 |
| | | | | 701/41 |
| 2018/0224856 A1* | 8/2018 | Durvasula | .............. | G05D 1/027 |
| 2018/0247138 A1* | 8/2018 | Kang | ................ | G08G 1/167 |

FOREIGN PATENT DOCUMENTS

| | | | |
|---|---|---|---|
| JP | 2007-122578 A | 5/2007 |
| JP | 2013-184563 A | 9/2013 |
| KR | 10-1998-068399 A | 10/1998 |
| KR | 10-2010-0104495 A | 9/2010 |
| KR | 10-1502511 B1 | 3/2015 |

* cited by examiner

AUTONOMOUS DRIVING CONTROL APPARATUS AND METHOD

CROSS-REFERENCE TO RELATED APPLICATION

The present application is a U.S. National Stage entry of International Patent Application No. PCT/KR2017/013708, filed on Nov. 28, 2017, which claims priority to Korean Patent Application No. 10-2016-0161365, filed on Nov. 30, 2016, the entire contents of which is incorporated herein for all purposes by this reference.

TECHNICAL FIELD

The present invention relates to an autonomous driving control apparatus and method, and more particularly, to an autonomous driving control apparatus and method which can control autonomous driving of a vehicle driving on a road with no lines.

Background Art

Today's vehicle industry is headed for implementation of autonomous driving to minimize a driver's intervention during driving. An autonomous vehicle refers to a vehicle which autonomously decides a driving route by recognizing the surrounding environment through an external information sensing and processing function during driving, and independently drives using it own power.

Although a driver does not operate a steering wheel, an acceleration pedal, a brake or the like, the autonomous vehicle can travel to its destination by itself while preventing a collision with an obstacle on the driving route and adjusting the speed and driving direction of the vehicle, depending on the shape of a road. For example, the autonomous vehicle may accelerate on a straight road, and decelerate on a curved road while changing the driving direction in response to the curvature of the road.

In order to guarantee stable driving of the autonomous vehicle, it is important to accurately measure a driving environment through various sensors mounted in the vehicle, to continuously monitor the driving state of the vehicle, to control driving according to the measured driving environment, and to previously prevent a route deviation or a collision with an obstacle using vehicle-to-vehicle communication or vehicle-to-infrastructure communication.

As a system for guaranteeing stable driving of the autonomous vehicle, a lane keeping assist system (LKAS) is applied to the autonomous vehicle. The LKAS serves to detect lines on the road where the autonomous vehicle is traveling, and assist steering of the vehicle, thereby preventing a lane deviation. However, when the road on which the autonomous vehicle is traveling has no lines, the function of the LKAS is limited. In other words, when the autonomous vehicle is driving on a road with no lines, the LKAS inevitably relies on a driver's manual steering.

When the autonomous vehicle travels on a road with no lines which has a relatively large width, driving congestion may occur in the case that a number of vehicles are on the road. Furthermore, when the autonomous vehicle travels on a road with no lines which has a relatively small width, the ease of driving may be reduced. In addition, when the autonomous vehicle travels on a curved road, the visibility for a front obstacle may be reduced to cause a collision. Therefore, there is a demand for a system capable of removing driving congestion when an autonomous vehicle travels on a road with no lines.

The related art of the present invention is disclosed in Korean Patent Publication No. 1998-0068399 published on Oct. 15, 1998.

DISCLOSURE

Technical Problem

Embodiments of the present invention are directed to an autonomous driving control apparatus and method which can improve the ease of driving and remove driving congestion by preventing a collision with a front vehicle or obstacle, when an autonomous vehicle drives on a road with no lines.

Technical Solution

In an embodiment, an autonomous driving control apparatus may include: an image capturing unit configured to capture a driving road image of an ego vehicle; and a control unit configured to generate virtual lanes on a road with no lines, the virtual lanes corresponding to the number of lanes which are decided based on the width of the road with no lines, when the road with no lines is detected in front of the ego vehicle through the driving road image captured by the image capturing unit, and control autonomous driving of the ego vehicle to drive on one of the generated virtual lanes. When a front object is detected from the driving road image, the control unit may control the autonomous driving of the ego vehicle to avoid the front object and drive on the road with no lines.

The control unit may generate the virtual lanes corresponding to the number of lanes which are decided based on a comparison result between the width of the road with no lines and a preset reference road width, wherein the reference road width is equal to or more than double a road width which is preset in consideration of a vehicle width.

When the width of the road with no lines is equal to or more than the reference road width, the control unit may generate the virtual lanes by generating a virtual center line on the road with no lines and then generating virtual lines such that one or more virtual lanes having the vehicle width are generated on both sides of the virtual center line.

When the front object detected from the driving road image is a driving front vehicle, the control unit may control the autonomous driving of the ego vehicle to maintain a distance from the front vehicle.

When the front object detected from the driving road image is a fixed obstacle, the control unit may determine whether the ego vehicle can bypass the fixed obstacle on a driving lane, based on the width of the driving lane, the size of the fixed obstacle and the vehicle width, and control autonomous driving of the ego vehicle according to the determination result, wherein the driving lane includes total virtual lanes generated in the direction where the ego vehicle is located based on the virtual center line.

When it is determined that the ego vehicle cannot bypass the fixed obstacle on the driving lane, the control unit may control the autonomous driving of the ego vehicle to bypass the fixed obstacle through an opposite lane, wherein the opposite lane includes a virtual lane generated in the opposite side of the driving lane based on the virtual center line.

When the width of the road with no lines is less than the reference road width, the control unit may generate the virtual lane as the road with no lines.

When the front object detected from the driving road image is a driving front vehicle, the control unit may control the autonomous driving of the ego vehicle in consideration of the driving direction of the front vehicle, such that the ego vehicle avoids the front vehicle.

When the front vehicle is driving in the dame direction as the ego vehicle, the control unit may control the autonomous driving of the ego vehicle to maintain a distance from the front vehicle.

The autonomous driving control apparatus may further include a vehicle communication unit configured to communicate with another vehicle. When the front vehicle is driving toward the ego vehicle, the control unit may decide which vehicle is to reverse between the ego vehicle and the front vehicle, based on driving history information of the ego vehicle and driving history information of the front vehicle which is received through the vehicle communication unit, wherein the driving history information includes width information of the road with no lines and distance information indicating the distance that the corresponding vehicle has driven on the road with no lines.

The control unit may calculate an avoidance reversing distance of the ego vehicle through the driving history information of the ego vehicle, and compares the avoidance reversing distance of the ego vehicle to an avoidance reversing distance of the front vehicle which is received through the vehicle communication unit, in order to decide which vehicle is to reverse, wherein the avoidance reversing distance is a reversing distance from the current location of the corresponding vehicle to a point where the width of the road with no lines becomes equal to or more than the reference road width.

When the front object detected from the driving road image is a fixed obstacle, the control unit determines whether the ego vehicle can bypass the fixed obstacle on the virtual lane where the ego vehicle is driving, based on the width of the virtual lane, the size of the fixed obstacle and the vehicle width, and control the autonomous driving of the ego vehicle according to the determination result.

When it is determined that the ego vehicle cannot bypass the fixed obstacle on the virtual lane where the ego vehicle is driving, the control unit may rescan a driving route, and control the ego vehicle to autonomously drive along the rescanned driving route.

In an embodiment, an autonomous driving control method may include: a virtual lane generation step in which a control unit generates virtual lanes on a road with no lines, the virtual lanes corresponding to the number of lanes which are decided based on the width of the road with no lines, when the road with no lines is detected in front of an ego vehicle through a driving road image; a first autonomous driving control step in which the control unit controls autonomous driving of the ego vehicle to drive on one of the generated virtual lanes; and a second autonomous driving control step in which the control unit controls the autonomous driving of the ego vehicle to avoid a front object and drive on the road with no lines, when the front object is detected from the driving road image.

Advantageous Effects

According to the embodiment of the invention, the autonomous driving apparatus and method can control a vehicle to autonomously drive along a virtual driving lane generated on a road with no lines. Thus, the autonomous driving apparatus and method can remove driving congestion even when a number of vehicles are driving, and effectively prevent a collision with a front obstacle even when visibility for the front vehicle is not secured depending on the surrounding environment, thereby avoiding an accident risk.

BEST MODE

Hereafter, an autonomous driving control apparatus and method in accordance with embodiments of the present invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
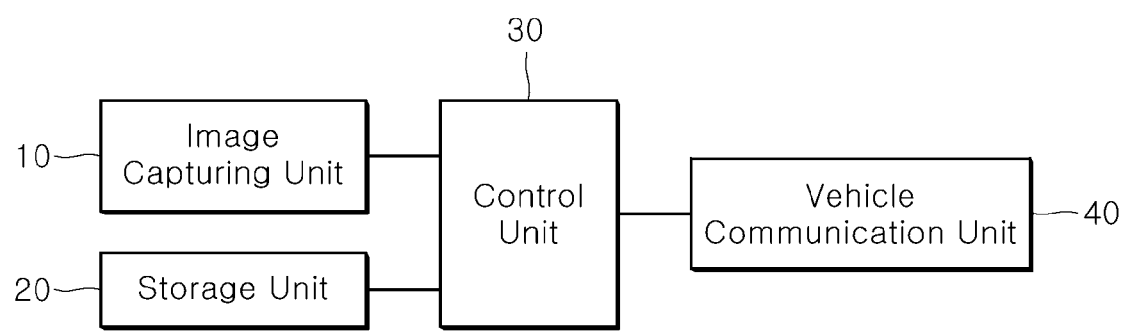
FIG. 1 is a block diagram for describing an autonomous driving control apparatus in accordance with an embodiment of the present invention.
Figure 2:
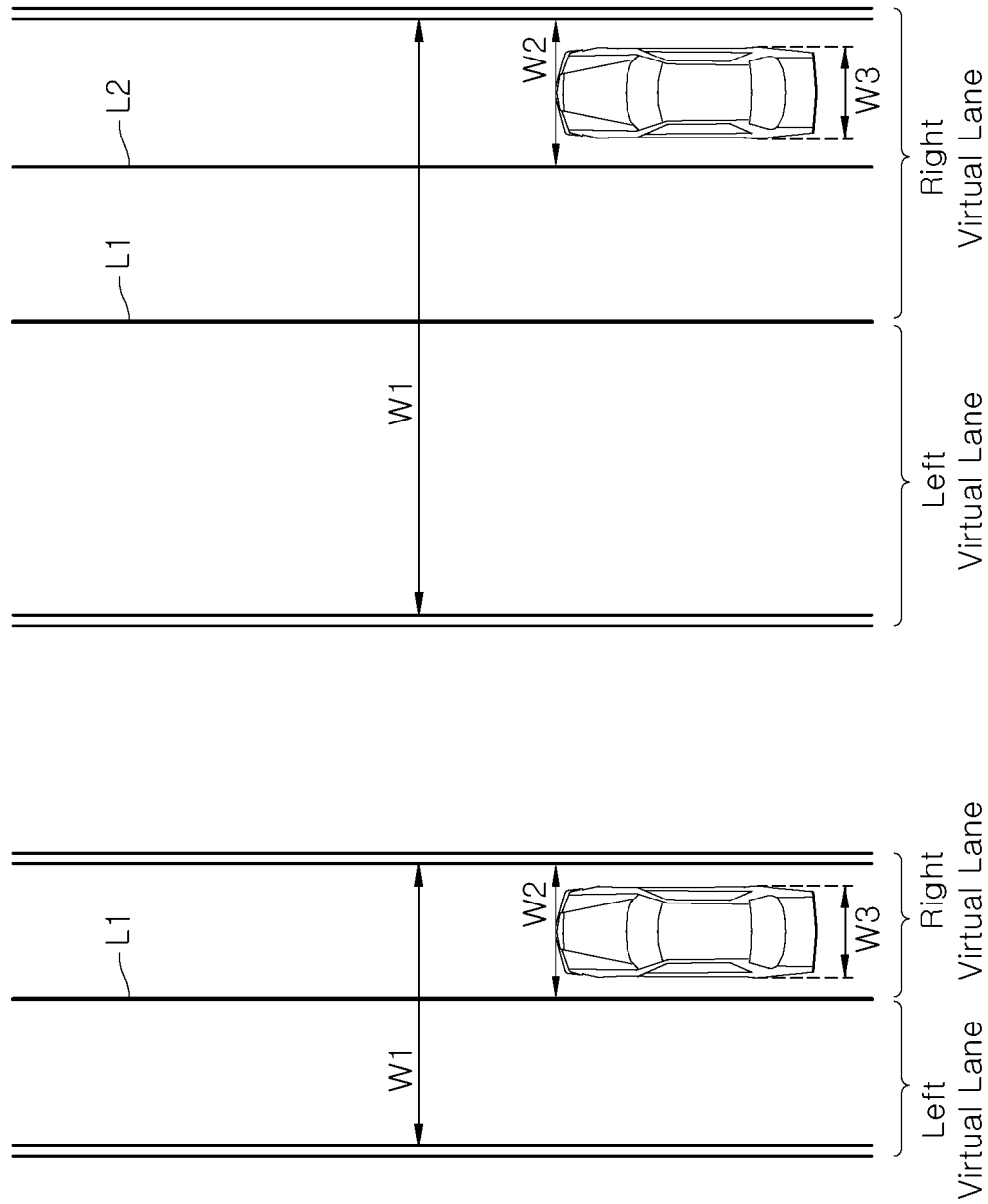
FIG. 2 is a diagram for describing a process in which the autonomous driving control apparatus in accordance with the embodiment of the present invention generates virtual lanes.
Figure 3:
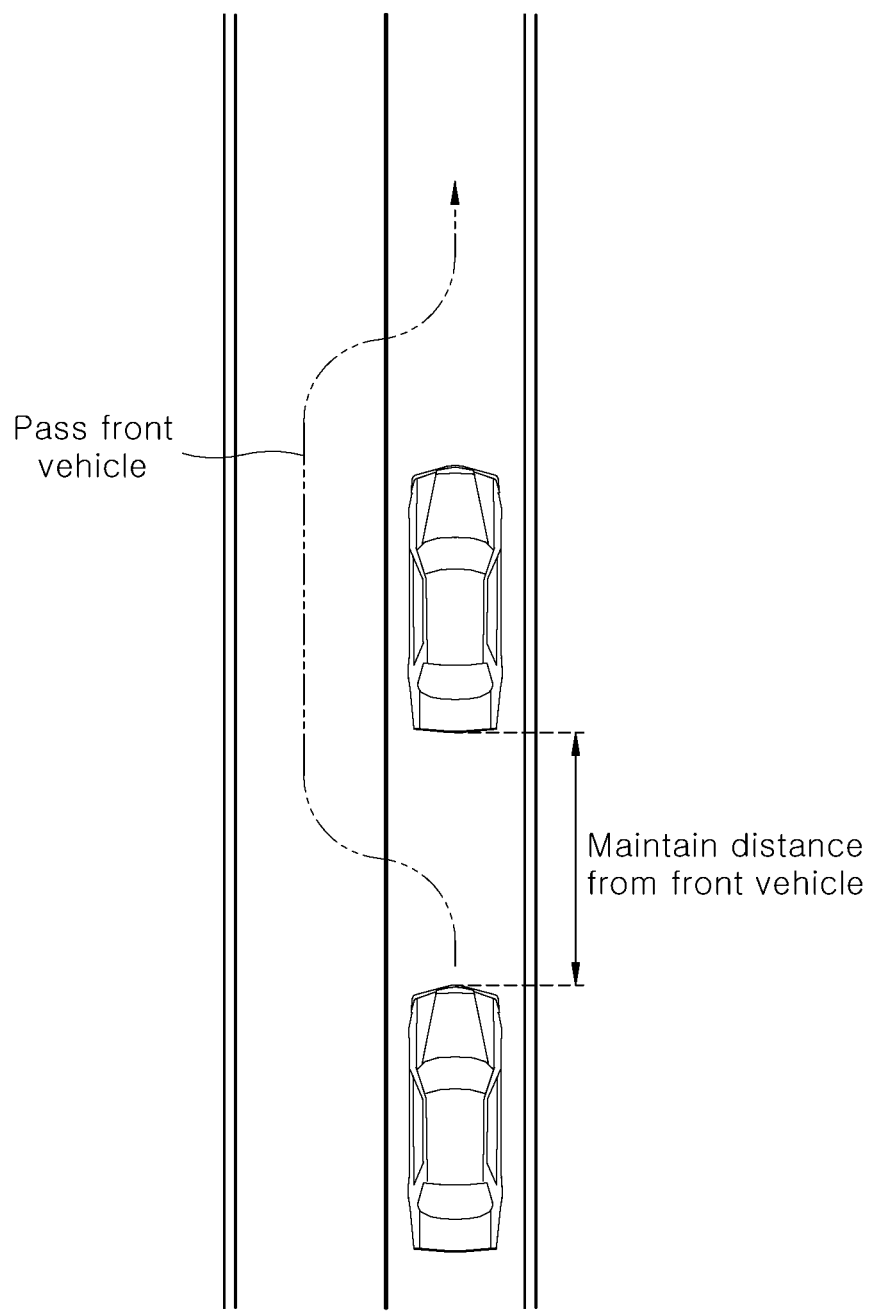
FIG. 3 is a diagram for describing a process in which the autonomous driving control apparatus in accordance with the embodiment of the present invention avoids a front vehicle.
Figure 4:
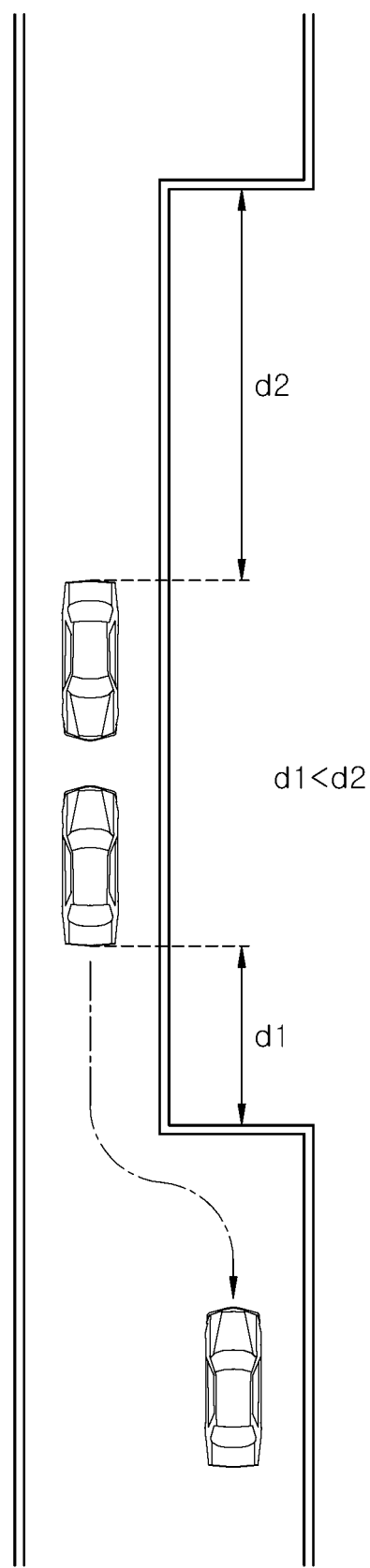
FIG. 4 is a diagram for describing a process in which the autonomous driving control apparatus in accordance with the embodiment of the present invention decides which vehicle needs to reverse.

FIG. 1 is a block diagram for describing an autonomous driving control apparatus in accordance with an embodiment of the present invention, FIG. 2 is a diagram for describing a process in which the autonomous driving control apparatus in accordance with the embodiment of the present invention generates virtual lanes, FIG. 3 is a diagram for describing a process in which the autonomous driving control apparatus in accordance with the embodiment of the present invention avoids a front vehicle, and FIG. 4 is a diagram for describing a process in which the autonomous driving control apparatus in accordance with the embodiment of the present invention decides which vehicle needs to reverse.

Referring to FIG. 1, the autonomous driving control apparatus in accordance with the embodiment of the present invention may include an image capturing unit 10, a storage unit 20, a control unit 30 and a vehicle communication unit 40.

The image capturing unit 10 may capture a driving road image of an ego vehicle. The driving road image may include a forward image and a backward image on the driving route of the ego vehicle, and the image capturing unit 10 may include a front camera and a rear camera for capturing the forward image and the rearward image, respectively.

The storage unit 20 may store driving history information. That is, when the ego vehicle enters a road with no lines as described later, the control unit 30 may store driving history information in the storage unit 20 in real time, the driving history information including distance information and width information of the road with no lines. The distance information may indicate the distance that the ego vehicle has traveled on the road with no lines. As will be described below, the driving history information stored in the storage unit 20 may be used to decide which vehicle needs to reverse, between the ego vehicle and a front vehicle driving toward the ego vehicle. The storage unit 20 may be implemented as a typical memory device such as a hard disk drive (HDD), a solid state drive (SSD), RAM or ROM to store the driving history information.

The vehicle communication unit 40 may receive vehicle information from surrounding vehicles or transmit vehicle information of the ego vehicle to the surrounding vehicles, based on vehicle-to-everything (V2X) communication with the surrounding vehicles. The V2X communication technology may be mounted as a communication function in a vehicle, and enable the vehicle to communicate with not only other vehicles (V2V) but also external objects including road infrastructures (V2I) or pedestrians (V2P). The V2X communication technology may automatically recognize the road environment where the vehicle is traveling, and provide the recognized information to a driver, thereby supporting autonomous driving and safe driving. In the present embodiment, the vehicle communication unit 40 may receive driving history information of a surrounding vehicle from the surrounding vehicle, and transmit the driving history information of the ego vehicle to the surrounding vehicle.

When a road with no lines is detected in front of the ego vehicle through the driving road image captured by the image capturing unit 10, the control unit 30 may generate virtual lanes on the road with no lines by the number of lanes which are decided based on the width of the road with no lines, and control autonomous driving of the ego vehicle to drive on one of the generated virtual lanes. Furthermore, the control unit 30 may control the autonomous driving of the ego vehicle to drive on the road with no lines while avoiding a front object detected from the driving road image. The control unit may be implemented as a processor such as an electronic control unit (ECU) mounted in the vehicle. The width of the road with no lines may be calculated by applying a predetermined image processing algorithm to a forward image captured by the image capturing unit 10, or calculated through a method of detecting the edges of the road through a radar sensor or lidar sensor mounted in the vehicle.

The control unit 30 may generate virtual lanes by the number of lanes which are decided based on a comparison result between the width of the road with no lanes and a preset reference road width, and the reference road width may be set to more than double a road width which is preset in consideration of the width of the vehicle.

That is, the width of the virtual lane to be generated may be preset in consideration of the width of the ego vehicle (for example, a legal lane width of a general road), such that the ego vehicle can easily drive. The reference road width may indicate a road width which is set to determine whether two or more virtual lanes can be generated on the road with no lines or whether a right virtual lane on which the ego vehicle can drive and a left virtual lane on which another vehicle can drive in the opposite direction can be generated based on a virtual center line. Thus, the reference road width may be set to more than double the vehicle width.

In the present embodiment, the process of generating virtual lanes according to the width of the road with no lines and the process of controlling autonomous driving to avoid a front object may be separately performed. Thus, the following descriptions will be divided into the case in which the width of the road with no lines is equal to or more than the reference road width and the case in which the width of the road with no lines is less than the reference road width, and the process of generating virtual lanes and the process of controlling autonomous driving to avoid a front object will be described in each of the cases.

First, the case in which the width of the road with no lines is equal to or more than the reference road width will be described.

When the width of the road with no lines is equal to or more than the reference road width, the control unit 30 may generate virtual lanes by generating a virtual center line on the road with no lines and then generating a virtual line such that one or more virtual lanes having a preset vehicle width are generated on both sides of the virtual center line.

Referring to FIG. 2, when the width W1 of the road with no lines is equal to or more than the reference road width, the control unit 30 may generate a virtual center line L1 on the road with no lines to generate a right virtual lane on which the ego vehicle can drive and a left virtual lane on which another vehicle can drive in the opposite direction. Furthermore, the control unit 30 may generate a virtual line L2 such that one or more virtual lanes having a vehicle width W2 are generated on both sides of the virtual center line L1 and distinguished by the virtual line L2. That is, the control unit 30 may generate two virtual lanes having the vehicle width on each of the left and right virtual lanes when the widths of the left and right virtual lanes are two times or more larger than the vehicle width, and generate three virtual lanes having the vehicle width on each of the left and right virtual lanes, when the widths of the left and right virtual lanes are three times or more larger than the vehicle width. For generalization, when the widths of the right and left virtual lanes are N times or more larger than the vehicle width, the control unit 30 may generate N virtual lanes having the vehicle width on each of the right and left virtual lanes. In an embodiment, the control unit 30 may generate one or more virtual lanes by generating a virtual line only on the right virtual lane, because the ego vehicle travels on the right virtual lane. The present embodiment is described based on the road transport system of Korea in which vehicles travel on the right side. However, the configuration of the present embodiment may also be applied to the road transport systems of other countries in which vehicles travel on the left side.

The control unit 30 may control autonomous driving of the ego vehicle to drive on the virtual lane generated through the above-described process. That is, the control unit 30 may select one virtual lane of the one or more virtual lanes and control the autonomous driving of the ego vehicle to drive along the selected virtual lane. When a front object is detected from the driving road image inputted from the image capturing unit 10, the control unit 30 may control the autonomous driving of the ego vehicle to avoid the detected front object.

Referring to FIG. 3, when the front object detected from the driving road image is a front vehicle driving in front of the ego vehicle, the control unit 30 may control autonomous driving of the ego vehicle to maintain a distance from the front vehicle. FIG. 3 is based on the supposition that the front vehicle is driving on the same virtual lane in the same direction as the ego vehicle, because two or more virtual lanes including the right virtual lane and the left virtual lane are generated. For this operation, the control unit 30 may control the autonomous driving of the ego vehicle to measure a distance from the front vehicle and to maintain a preset reference inter-vehicle distance. In order to measure the distance from the front vehicle, the control unit 30 may transmit a pulse signal to the front vehicle through an ultrasonic sensor, a radar sensor or a lidar sensor installed at the front of the vehicle, and then measure the time required until the pulse signal is reflected from the front vehicle and returns to the ego vehicle.

The control unit 30 may decide whether to pass the front vehicle, based on the speed of the front vehicle driving in front of the ego vehicle, and control the autonomous driving of the ego vehicle to pass the front vehicle. That is, when the speed of the front vehicle driving in front of the ego vehicle is equal to or less than a preset reference vehicle speed, the control unit 30 may determine that the front vehicle is driving at low speed, and determine whether the ego vehicle can pass the front vehicle on the driving lane, based on a distance from the front vehicle to the virtual center line or a distance from the front vehicle to the edge of the driving lane. When it is determined that the ego vehicle can pass the front vehicle on the driving lane, the control unit 30 may control the autonomous driving of the ego vehicle to pass the front vehicle on the driving lane. On the other hand, when it is determined that the ego vehicle cannot pass the front vehicle on the driving lane, the control unit 30 may control the autonomous driving of the ego vehicle to pass the front vehicle using the opposite lane. The driving lane may be defined as all virtual lanes generated in the direction where the ego vehicle is positioned, based on the virtual center line, and the opposite lane may be defined as a virtual lane generated in the opposite side of the driving lane based on the virtual center line. That is, in the present embodiment, the driving lane is the right virtual lane, and the opposite lane is the left virtual lane.

When the front object detected from the driving road image is a fixed obstacle, the control unit 30 may determine whether the ego vehicle can bypass the fixed obstacle on the driving lane, based on the width of the driving lane, the size of the fixed obstacle and the vehicle width, and control autonomous driving of the ego vehicle according to the determination result. The fixed obstacle may include all objects which are located on the road with no lines and interfere with the driving of the ego vehicle. For example, the fixed obstacle may include a stopped or parked vehicle.

The control unit 30 may calculate a distance from the fixed obstacle to the virtual center line or a distance from the fixed obstacle to the edge of the driving lane, compare the calculated distance and the vehicle width to determine whether the ego vehicle can bypass the fixed obstacle on the driving lane, and control the autonomous driving of the ego vehicle according to the determination result. In order to calculate the distance, the control unit 30 may apply a predetermined image processing algorithm to the driving road image or use the above-described ultrasonic sensor and radar sensor.

When the calculated distance is larger than the vehicle width, the control unit 30 may control the autonomous vehicle of the ego vehicle to bypass the fixed obstacle on the driving lane. That is, the control unit 30 may control the autonomous driving of the ego vehicle to bypass the fixed obstacle on the driving lane through the virtual lane where the ego vehicle is driving or another virtual lane.

When the calculated distance is equal to or less than the vehicle width, the control unit 30 may determine that the ego vehicle cannot bypass the fixed obstacle on the driving lane, and control the autonomous driving of the ego vehicle to bypass the fixed obstacle through the opposite lane. At this time, when another vehicle driving on the opposite lane is detected from the driving road image inputted from the image capturing unit 10, the control unit 30 may control the autonomous driving of the ego vehicle to bypass the fixed obstacle through the opposite lane after waiting until the another vehicle passes.

Next, the case in which the width of the road with no lines is less than the reference road width will be described.

When the width of the road with no lines is less than the reference road width, the control unit 30 may generate a virtual lane as the road with no lines. That is, when the width of the road with no lines is less than the reference road width, the control unit 30 may determine that two or more virtual lanes cannot be generated, and generate one virtual lane as the detected road with no lines.

The control unit 30 may control the autonomous driving of the ego vehicle to drive on the virtual lane generated through the above-described process, and control the autonomous driving of the ego vehicle to drive on the right side of the virtual lane, by considering that only one virtual lane was generated. When a front object is detected from the driving road image inputted from the image capturing unit 10 while the autonomous driving of the ego vehicle is controlled, the control unit 30 may control the autonomous driving of the ego vehicle to drive on the road with no lines while avoiding the detected front object.

At this time, when the front object detected from the driving road image is a front vehicle driving in front of the ego vehicle, the control unit 30 may control the autonomous driving of the ego vehicle in consideration of the driving direction of the front vehicle, such that the ego vehicle avoids the front vehicle.

Specifically, when the front vehicle is driving in the same direction as the ego vehicle, the control unit 30 may control the autonomous driving of the ego vehicle to maintain a distance from the front vehicle. Since the operation is performed in the same manner as described above, the detailed descriptions thereof will be omitted herein.

When the front vehicle is driving toward the ego vehicle or driving in the opposite direction of the ego vehicle, the control unit 30 may decide which vehicle needs to reverse between the ego vehicle and the front vehicle, based on driving history information of the ego vehicle and driving history information of the front vehicle which is inputted through the vehicle communication unit 40. The driving history information may include width information of the road with no lines and distance information indicating the distance that the corresponding vehicle has traveled on the road with no lines.

Referring to FIG. 4, when the width of the road with no lines is less than the reference road width, the control unit 30 may store the driving history information in the storage unit 20 in real time, in the case that the ego vehicle enters the road with no lines. The driving history information may include the driving distance information and the width information of the road with no lines where the ego vehicle is driving. The driving distance information and the width information of the driving history information may be used to calculate an avoidance reversing distance. The avoidance reversing distance may be defined as a reversing distance from the current location of the vehicle to a point where two or more vehicles can enter because the width of a road with no lines is equal to or more than the reference road width.

Therefore, when it is determined that the front vehicle detected from the driving road image is driving toward the ego vehicle, the control unit 30 may calculate an avoidance reversing distance d1 of the ego vehicle through the driving history information, and compare the avoidance reversing distance d1 to an avoidance reversing distance d2 of the front vehicle, inputted through the vehicle communication unit 40, in order to decide which vehicle needs to reverse between the ego vehicle and the front vehicle. When the avoidance reversing distance of the ego vehicle is smaller than the avoidance reversing distance of the front vehicle, the control unit 30 may decide that the ego vehicle needs to reverse. On the other hand, when the avoidance reversing distance of the ego vehicle is larger than the avoidance reversing distance of the front vehicle, the control unit 30 may decide that the front vehicle needs to reverse, and wait for the front vehicle to reverse.

During the process of deciding which vehicle needs to reverse, the control unit 30 may decide the vehicle by further considering the number of other vehicles located behind the ego vehicle and the number of other vehicles located behind the front vehicle. For example, when the number of other vehicles located behind the front vehicle far exceeds the number of other vehicles located behind the ego vehicle even though the avoidance reversing distance of the ego vehicle is larger than the avoidance reversing distance of the front vehicle, the control unit 30 may decide that the ego vehicle needs to reverse, in order to avoid driving congestion. In short, the control unit 30 may decide which vehicle needs to reverse, by considering the comparison result between the avoidance reversing distance of the ego vehicle and the avoidance reversing distance of the front vehicle and the comparison result between the number of other vehicles located behind the ego vehicle and the number of other vehicles located behind the front vehicle. At this time, any one of the avoidance reversing distance and the number of other vehicles behind, which is to be preferentially considered, may be designed in various manners depending on their values, and preset in the control unit 30. That is, when a difference between the avoidance reversing distance of the ego vehicle and the avoidance reversing distance of the front vehicle is equal to or more than a first threshold value, the control unit 30 may preferentially consider the avoidance reversing distance to decide which vehicle needs to reverse. Furthermore, when a difference between the number of other vehicles located behind the ego vehicle and the number of other vehicles located behind the front vehicle is equal to or more than a second threshold value, the control unit 30 may preferentially consider the number of other vehicles behind to decide which vehicle needs to reverse. The number of other vehicles behind may be calculated from a backward image captured by the image capturing unit 10. When a vehicle which needs to reverse is decided, the other vehicles behind the vehicle may sequentially reverse from the vehicle located at the rearmost.

Next, when the front object detected from the driving road image is a fixed obstacle, the control unit 30 may determine whether the ego vehicle can bypass the fixed obstacle on the virtual lane where the ego vehicle is driving, based on the width of the virtual lane, the size of the fixed obstacle and the vehicle width, and control autonomous driving of the ego vehicle according to the determination result.

At this time, the control unit 30 may calculate a distance from the fixed obstacle to the edge of the virtual lane where the ego vehicle is driving, compare the calculated distance to the vehicle width to determine whether the ego vehicle can bypass the fixed obstacle on the virtual lane, and control the autonomous driving of the ego vehicle according to the determination result.

When the calculated distance is larger than the vehicle width, the control unit 30 may control the autonomous vehicle of the ego vehicle to bypass the fixed obstacle on the virtual lane where the ego vehicle is driving.

When the calculated distance is equal to or less than the vehicle width or it is determined that the fixed obstacle cannot be removed, the control unit 30 may determine that the ego vehicle cannot bypass the fixed obstacle on the virtual lane where the ego vehicle is driving, rescan a driving route, and control the ego vehicle to autonomously drive along the rescanned driving route.

Figure 5:
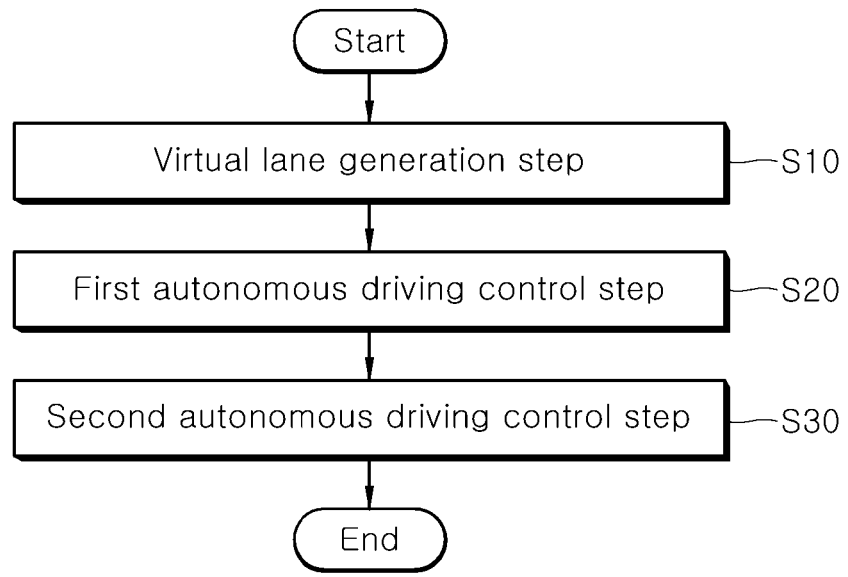
FIG. 5 is a flowchart for describing an autonomous driving control method in accordance with an embodiment of the present invention.
Figure 6:
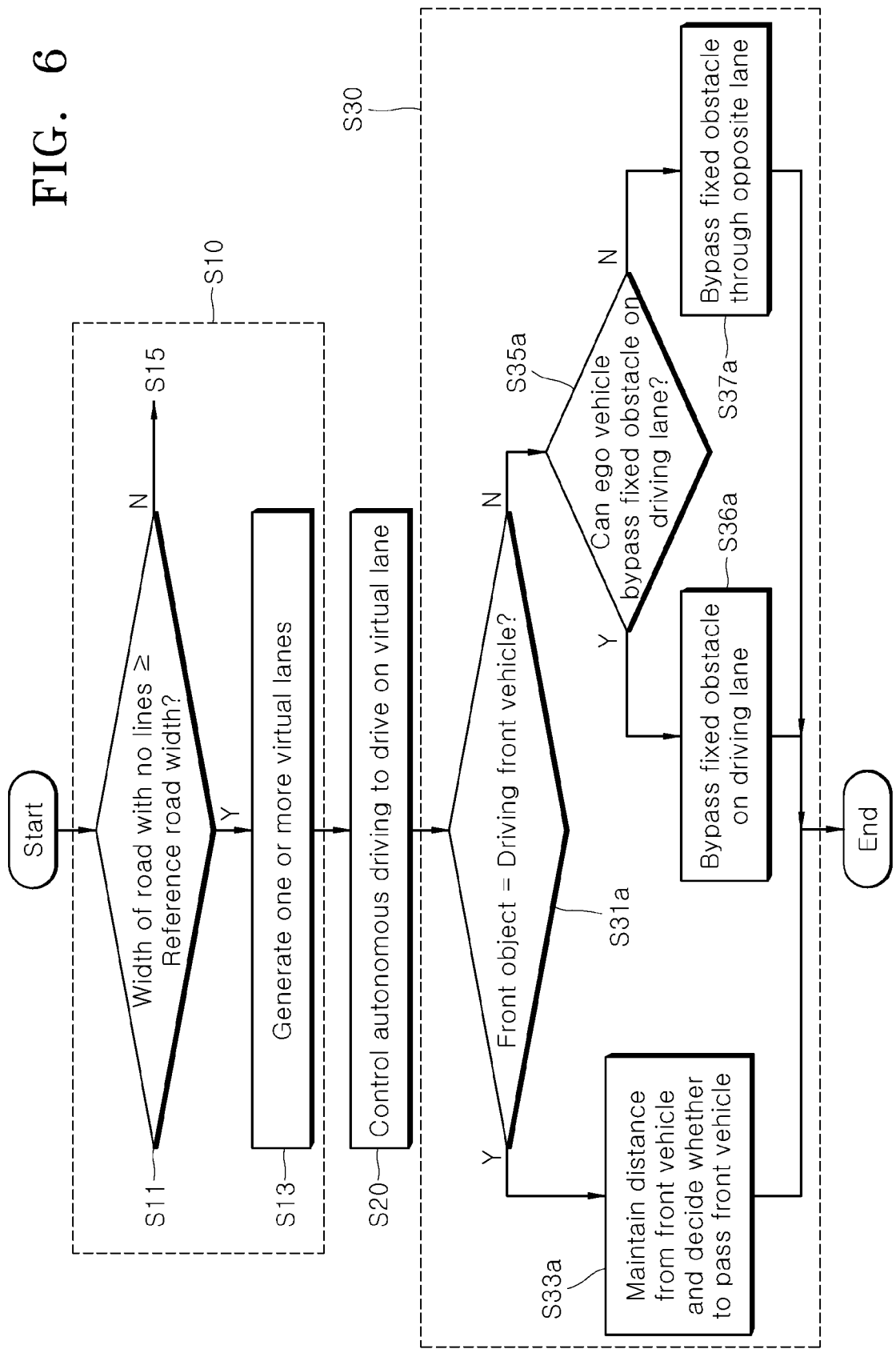
FIG. 6 is a flowchart for describing a virtual lane generation step and first and second autonomous driving control steps in the autonomous driving control method in accordance with the embodiment of the present invention, when the width of a road with no lines is equal to or more than a reference road width.
Figure 7:
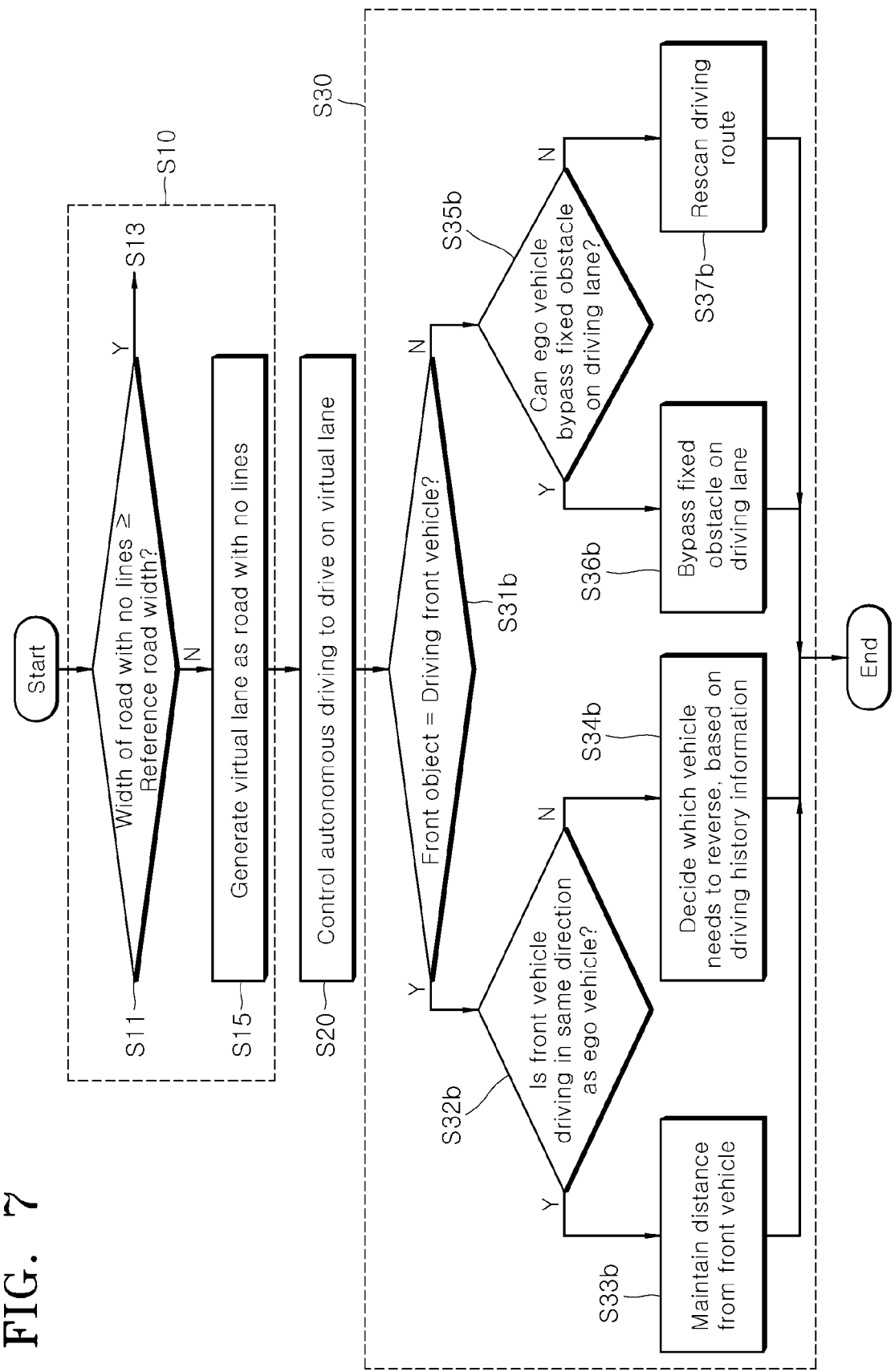
FIG. 7 is a flowchart for describing the virtual lane generation step and the first and second autonomous driving control steps in the autonomous driving control method in accordance with the embodiment of the present invention, when the width of the road with no lines is less than the reference road width.

FIG. 5 is a flowchart for describing an autonomous driving control method in accordance with an embodiment of the present invention, FIG. 6 is a flowchart for describing a virtual lane generation step and first and second autonomous driving control steps in the autonomous driving control method in accordance with the embodiment of the present invention, when the width of a road with no lines is equal to or more than a reference road width, and FIG. 7 is a flowchart for describing the virtual lane generation step and the first and second autonomous driving control steps in the autonomous driving control method in accordance with the embodiment of the present invention, when the width of the road with no lines is less than the reference road width.

Referring to FIG. 5, the autonomous driving control method in accordance with the embodiment of the present invention may include a virtual lane generation step S10, a first autonomous driving control step S20 and a second autonomous driving control step S30. The virtual lane generation step S10 may include generating virtual lanes on a road with no lines by the number of lanes which are decided based on the width of the road with no lines, when the road with no lines is detected in front of the ego vehicle through a driving road image. The first autonomous driving control step S20 may include controlling autonomous driving of the ego vehicle to drive on one of the generated virtual lanes. The second autonomous driving control step S30 may include controlling the autonomous driving of the ego vehicle to avoid a front object on the road with no lines, when the front object is detected from the driving road image.

In the virtual lane generation step S10, the control unit 30 may generate virtual lanes by the number of lanes which are decided based on a comparison result between the width of the road with no lines and the preset reference road width. The reference road width may be set to more than double a lane width which is preset in consideration of the width of the vehicle.

The virtual lane generation step S10 and the first and second autonomous driving control steps S20 and S30 are separately performed according to the comparison result between the width of the road with no lines and the preset reference road width. Therefore, the following descriptions will be divided into the case in which the width of the road with no lines is equal to or more than the reference road width and the case in which the width of the road with no lines is less than the reference road width, and the virtual lane generation step S10 and the first and second autonomous driving control steps S20 and S30 will be described for each of the cases.

Referring to FIG. 6, the case in which the width of the road with no lines is equal to or more than the reference road width will be described.

In the virtual lane generation step S10, when it is determined in step S11 that the width of the road with no lines is equal to or more than the reference road width, the control unit 30 may generate virtual lanes by generating a virtual center line on the road with no lines and then generating virtual lines such that one or more virtual lanes having a preset vehicle width are generated on both sides of the virtual center line, in step S13. Then, the control unit 30 may control autonomous driving of the ego vehicle to drive on one of the generated virtual lanes.

In the second autonomous driving control step S30, when it is determined in step S31a that a front object detected from the driving road image is a driving front vehicle, the control unit 30 may control autonomous driving of the ego vehicle to maintain a distance from the front vehicle. Then, the control unit 30 may decide whether to pass the front vehicle, based on the speed of the front vehicle, in step S33a.

When the front object detected from the driving road image is a fixed obstacle, the control unit 30 may determine whether the ego vehicle can bypass the fixed obstacle on the driving lane, based on the width of the driving lane, the size of the fixed obstacle and the vehicle width, in step S35a, and control the autonomous driving of the ego vehicle according to the determination result. The driving lane may be defined as all virtual lanes generated in the direction where the ego vehicle is located, based on the virtual center line.

When it is determined that the ego vehicle can bypass the fixed obstacle on the driving lane, the control unit 30 may control the autonomous driving of the ego vehicle to bypass the fixed obstacle on the driving lane through the virtual lane on which the ego vehicle is driving or another virtual lane, in step S36a.

When it is determined that the ego vehicle cannot bypass the fixed obstacle on the driving lane, the control unit 30 may control autonomous driving of the ego vehicle to bypass the fixed obstacle through the opposite lane, in step S37a. The opposite lane may be defined as a virtual lane generated in the opposite side of the driving lane based on the virtual center line. At this time, when another vehicle driving on the opposite lane is detected from the driving road image inputted from the image capturing unit 10, the control unit 30 may control the autonomous driving of the ego vehicle to bypass the fixed obstacle through the opposite lane after waiting until the another vehicle passes.

Referring to FIG. 7, the case in which the width of the road with no lines is less than the reference road width will be described.

In the virtual lane generation step S10, when it is determined step S11 that the width of the road with no lines is less than the reference road width, the control unit 30 may generate a virtual lane as the road with no lines in step S15. That is, when the width of the road with no lines is less than the reference road width, the control unit 30 may determine that two or more virtual lanes cannot be generated, and generate one virtual lane as the detected road with no lines. Then, the control unit 30 may control autonomous driving of the ego vehicle to drive on the generated virtual lanes.

In the second autonomous driving control step S30, when it is determined in step S31b that a front object detected from the driving road image is a front vehicle driving in front of the ego vehicle, the control unit 30 may control the autonomous driving of the ego vehicle in consideration of the driving direction of the front vehicle, such that the ego vehicle avoids the front vehicle.

Specifically, when the front vehicle is driving in the same direction as the ego vehicle, the control unit 30 may control the autonomous driving of the ego vehicle to maintain a distance from the front vehicle in step S33b.

When the front vehicle is driving toward the ego vehicle, the control unit 30 may decide which vehicle needs to reverse between the ego vehicle and the front vehicle, based on driving history information of the ego vehicle and driving history information of the front vehicle which is inputted through the vehicle communication unit 40, in step S34b. The driving history information may include width information of the road with no lines and distance information indicating the distance that the corresponding vehicle has traveled on the road with no lines. Therefore, the control unit 30 may calculate an avoidance reversing distance of the ego vehicle through the driving history information of the ego vehicle, and compare the calculated avoidance reversing distance of the ego vehicle to an avoidance reversing distance of the front vehicle, in order to decide the vehicle which needs to reverse. During the process of deciding the vehicle which needs to reverse, the control unit 30 may further consider the number of other vehicles located behind the ego vehicle and the number of other vehicles located behind the front vehicle, as described above.

When it is determined in step S31b that the front object detected from the driving road image is a fixed obstacle, the control unit 30 may determine whether the ego vehicle can bypass the fixed obstacle on the virtual lane where the ego vehicle is driving, based on the width of the virtual lane, the size of the fixed obstacle and the vehicle width, in step S35b, and control the autonomous driving of the ego vehicle according to the determination result.

When it is determined that the ego vehicle can bypass the fixed obstacle on the virtual lane where the ego vehicle is driving, the control unit 30 may control the autonomous driving of the ego vehicle to bypass the fixed obstacle on the virtual lane, in step S36b.

When it is determined that the ego vehicle cannot bypass the fixed obstacle on the virtual lane where the ego vehicle is driving or it is determined that the fixed obstacle cannot be removed, the control unit 30 may rescan a driving route, and control the ego vehicle to autonomously travel on the rescanned driving route, in step S37b.

In the present embodiment, the autonomous driving apparatus and method can control a vehicle to autonomously drive along a virtual driving lane generated on a road with no lines. Thus, the autonomous driving apparatus and method can remove driving congestion even when a number of vehicles are driving, and effectively prevent a collision with a front obstacle even when visibility for the front vehicle is not secured depending on the surrounding environment, thereby avoiding an accident risk.

Although some embodiments have been provided to illustrate the invention in conjunction with the drawings, it will be apparent to those skilled in the art that the embodiments are given by way of illustration only, and that various modifications and equivalent embodiments can be made without departing from the spirit and scope of the invention. The scope of the invention should be limited only by the accompanying claims.

The invention claimed is:

1. An autonomous driving control apparatus comprising:
an image capturing unit configured to capture a driving road image of an ego vehicle; and
a control unit configured to generate virtual lanes on a road with no lines, a number of the virtual lanes corresponding to a number of lanes which are decided based on the width of the road with no lines, when the road with no lines is detected in front of the ego vehicle through the driving road image captured by the image capturing unit, and control autonomous driving of the ego vehicle to drive on one of the generated virtual lanes,
wherein when a front object is detected from the driving road image, the control unit controls the autonomous driving of the ego vehicle to avoid the front object and drive on the road with no lines,
wherein the control unit generates the number of the virtual lanes corresponding to the number of lanes which are decided based on a comparison result between the width of the road with no lines and a preset reference road width, wherein the reference road width is equal to or more than double a road width which is preset in consideration of a vehicle width,
wherein when the width of the road with no lines is less than the reference road width, the control unit generates the virtual lanes as the road with no lines,
wherein when the front object detected from the driving road image is a driving front vehicle, the control unit controls the autonomous driving of the ego vehicle in consideration of a driving direction of the front vehicle, so that the ego vehicle avoids the front vehicle,
wherein when the front vehicle is driving toward the ego vehicle, the control unit decides which vehicle is to reverse between the ego vehicle and the front vehicle, based on driving history information of the ego vehicle and driving history information of the front vehicle.

2. The autonomous driving control apparatus of claim 1, wherein when the width of the road with no lines is equal to or more than the reference road width, the control unit generates the virtual lanes by generating a virtual center line on the road with no lines and then generating virtual lines such that one or more virtual lanes having the vehicle width are generated on both sides of the virtual center line.

3. The autonomous driving control apparatus of claim 2, wherein when the front object detected from the driving road image is a fixed obstacle, the control unit determines whether the ego vehicle can bypass the fixed obstacle on a driving lane, based on the width of the driving lane, a size of the fixed obstacle and the vehicle width, and controls the autonomous driving of the ego vehicle according to the determination result,
wherein the driving lane comprises virtual lanes generated in a direction where the ego vehicle is located based on the virtual center line.

4. The autonomous driving control apparatus of claim 3, wherein when it is determined that the ego vehicle cannot bypass the fixed obstacle on the driving lane, the control unit controls the autonomous driving of the ego vehicle to bypass the fixed obstacle through an opposite lane,
wherein the opposite lane comprises a virtual lane generated in an opposite side of the driving lane based on the virtual center line.

5. The autonomous driving control apparatus of claim 1, wherein when the front vehicle is driving in the same direction as the ego vehicle, the control unit controls the autonomous driving of the ego vehicle to maintain a distance from the front vehicle.

6. The autonomous driving control apparatus of claim 1, further comprising a vehicle communication unit configured to communicate with a surrounding vehicle,
wherein the control unit receives the driving history information of the ego vehicle and the driving history information of the front vehicle through the vehicle communication unit,
wherein the driving history information comprises width information of the road with no lines and distance information indicating a distance that the corresponding vehicle has driven on the road with no lines.

7. The autonomous driving control apparatus of claim 6, wherein the control unit calculates an avoidance reversing distance of the ego vehicle through the driving history information of the ego vehicle, and compares the avoidance reversing distance of the ego vehicle to an avoidance reversing distance of the front vehicle which is received through the vehicle communication unit, in order to decide which vehicle is to reverse,
wherein the avoidance reversing distance is a reversing distance from the current location of the corresponding vehicle to a point where the width of the road with no lines becomes equal to or more than the reference road width.

8. An autonomous driving control method comprising:
a virtual lane generation step in which a control unit generates virtual lanes on a road with no lines, a number of the virtual lanes corresponding to a number of lanes which are decided based on the width of the road with no lines, when the road with no lines is detected in front of an ego vehicle through a driving road image;
a first autonomous driving control step in which the control unit controls autonomous driving of the ego vehicle to drive on one of the generated virtual lanes; and
a second autonomous driving control step in which the control unit controls the autonomous driving of the ego vehicle to avoid a front object and drive on the road with no lines, when the front object is detected from the driving road image,
wherein in the virtual lane generation step,
the control unit generates the number of the virtual lanes corresponding to the number of lanes which are decided based on a comparison result between the width of the road with no lines and a preset reference road width, wherein the reference road width is equal to or more than double a road width which is preset in consideration of a vehicle width,
wherein in the virtual lane generation step,
when the width of the road with no lines is less than the reference road width, the control unit generates the virtual lanes as the road with no lines,
when a front object detected from the driving road image is a driving front vehicle, the control unit controls the autonomous driving of the ego vehicle in consideration of a driving direction of the front vehicle, so that the ego vehicle avoids the front vehicle,
wherein in the second autonomous driving control step,
when the front vehicle is driving toward the ego vehicle, the control unit decides which vehicle is to reverse between the ego vehicle and the front vehicle, based on driving history information of the ego vehicle and driving history information of the front vehicle.

9. The autonomous driving control method of claim 8, wherein in the virtual lane generation step, when the width of the road with no lines is equal to or more than the reference road width, the control unit generates the virtual lanes by generating a virtual center line on the road with no lines and then generating virtual lines such that one or more virtual lanes having the vehicle width are generated on both sides of the virtual center line.

10. The autonomous driving control method of claim 9, wherein in the second autonomous driving control step, when the front object detected from the driving road image is a fixed obstacle, the control unit determines whether the ego vehicle can bypass the fixed obstacle on a driving lane, based on the width of the driving lane, a size of the fixed obstacle and the vehicle width, and controls the autonomous driving of the ego vehicle according to the determination result, wherein the driving lane comprises virtual lanes generated in the direction where the ego vehicle is located, based on the virtual center line.

11. The autonomous driving control method of claim 10, wherein in the second autonomous driving control step, when it is determined that the ego vehicle cannot bypass the fixed obstacle on the driving lane, the control unit controls the autonomous driving of the ego vehicle to bypass the fixed obstacle through an opposite lane, wherein the opposite lane comprises a virtual lane generated in an opposite side of the driving lane based on the virtual center line.

12. The autonomous driving control method of claim 8, wherein in the second autonomous driving control step, when the front vehicle is driving in the same direction as the ego vehicle, the control unit controls the autonomous driving of the ego vehicle to maintain a distance from the front vehicle.

13. The autonomous driving control method of claim 8, wherein the driving history information comprises width information of the road with no lines and distance information indicating a distance that the ego vehicle has driven on the road with no lines.

14. The autonomous driving control method of claim 13, wherein in the second autonomous driving control step, the control unit calculates an avoidance reversing distance of the ego vehicle through the driving history information of the ego vehicle, and compares the avoidance reversing distance of the ego vehicle to an avoidance reversing distance of the front vehicle, calculated through the driving history information of the front vehicle, in order to decide which vehicle is to reverse, wherein the avoidance reversing distance is a reversing distance from the current location of the corresponding vehicle to a point where the width of the road with no lines becomes equal to or more than the reference road width.

\* \* \* \* \*